(12) United States Patent
Wong et al.

(10) Patent No.: US 8,299,411 B2
(45) Date of Patent: Oct. 30, 2012

(54) CONTROL SURFACE ACTUATION SYSTEM

(75) Inventors: Frank Wong, Quebec (CA); Camille Alain Rabbath, L'Ancienne-Lorette (CA); Nicholas Lechevin, Quebec (CA); Olivier Boissonneault, Saint-Apollinaire (CA)

(73) Assignee: Her Majesty in Right of Canada as Represented by the Minister of National Defence, Ottawa, Ontario (CA)

( * ) Notice: Subject to any disclaimer, the term of this patent is extended or adjusted under 35 U.S.C. 154(b) by 826 days.

(21) Appl. No.: 12/153,859

(22) Filed: May 27, 2008

(65) Prior Publication Data

US 2008/0296438 A1      Dec. 4, 2008

Related U.S. Application Data

(60) Provisional application No. 60/924,859, filed on Jun. 1, 2007.

(51) Int. Cl.
  *F42B 15/01*      (2006.01)
(52) U.S. Cl. ...................... 244/3.28; 244/3.21; 244/99.2
(58) Field of Classification Search ................. 244/3.21, 244/3.24, 3.27, 3.28, 99.2, 99.3, 99.8, 99.14
  See application file for complete search history.

(56) References Cited

U.S. PATENT DOCUMENTS

| | | | |
|---|---|---|---|
| 4,497,241 A * | 2/1985 | Ohkata | 454/258 |
| 4,860,040 A * | 8/1989 | Tamamura et al. | 396/89 |
| 5,114,104 A | 5/1992 | Cincotta et al. | |
| 5,440,193 A * | 8/1995 | Barrett | 310/328 |
| 5,662,294 A | 9/1997 | Maclean et al. | |
| 5,934,609 A | 8/1999 | Kuklinski | |
| 6,390,878 B1 * | 5/2002 | Zhou et al. | 446/14 |
| 6,685,143 B1 * | 2/2004 | Prince et al. | 244/203 |
| 6,735,936 B2 * | 5/2004 | Rey et al. | 60/226.3 |
| 7,070,144 B1 * | 7/2006 | DiCocco et al. | 244/3.21 |
| 7,692,127 B1 * | 4/2010 | Linn et al. | 244/3.21 |
| 2003/0053192 A1 | 3/2003 | Islam et al. | |
| 2004/0129838 A1 | 7/2004 | Prince et al. | |

FOREIGN PATENT DOCUMENTS

WO      WO9950141      10/1999

OTHER PUBLICATIONS

Wong, F.C. "Missile flight control using micro-actuated flow effectors—Review of fiscal year 2004/2005 progress." DRDC Valcartier TN 2005-282. Sep. 2005.*

(Continued)

*Primary Examiner* — Tien Dinh
*Assistant Examiner* — Michael Kreiner
(74) *Attorney, Agent, or Firm* — Brion Raffoul (57) ABSTRACT

Systems for controlling flow effector control surfaces. The system comprises a flow effector control coupled to an elongated bar at one end of the bar. The elongated bar is coupled at the other end to the middle of a T-shaped member. A compliant link is coupled to the bar between the control surface and the T-shaped member. At each end of the T-shaped member is coupled a shape memory alloy wire which acts as an actuating means. When one of the shape memory alloy wire contracts, the elongated bar pivots about the compliant link and activates or retracts the flow effector control surface.

5 Claims, 7 Drawing Sheets

OTHER PUBLICATIONS

Léchevin et al. "Synthesis and Experimental Validation of Two-Step Variable-Structure Control of a Micro-Actuated Flow Effector." Proceedings of the 2007 American Control Conference. Jul. 11-13, 2007.*

Wong, F.C. "Missile flight control using micro-actuated flow effectors—Review of fiscal year 2005/2006 progress." DRDC Valcartier TN 2006-178. Aug. 2005.*

Oxford English Dictionary entry: "member, n. and adj." Third edition, Jun. 2001; online version Mar. 2011. <http://www.oed.com:80/Entry/116296>; accessed Jun. 9, 2011. An entry for this word was first included in New English Dictionary, 1906.*

S. Gowing et al., "FlexTAC: An Advanced Submarine Control Surface and Actuation System", Naval Surface Warfare Center, Carderock Div, Bathesda MD, Population and Fluid Systems Dept., 2003.

M. Elahinia et al., "Sliding Mode Control of a Shape Memory Alloy Actuated Manipulator", Virginia Polytechnic Institute and State University, Blackburg Department of Mechanical Engineering, pp. 1-7.

J. Strelec et al., "Fabrication and Testing of a Shape Memory Allow Actuated Reconfigurable Wing", Aerospace Engineering Department, Texas A&M University, College Station, TX, pp. 1-14.

* cited by examiner

CONTROL SURFACE ACTUATION SYSTEM

This application claims benefit of priority under 35 USC 119(e) from U.S. provisional patent application 60/924,859 filed 1, Jun. 2007.

FIELD OF THE INVENTION

The present invention relates to control systems for control surfaces on aircraft or airborne munitions. Specifically, the present invention relates to methods and devices for controlling control surfaces which affect velocity and pressure fields.

BACKGROUND TO THE INVENTION

Efficient guidance systems for airborne munitions and efficient control systems for aircraft have always been in high demand. The main objectives for new technologies in aerospace have always been increased speed and range in aerovehicles and reduced volume and weight of vehicle components. In recent years, smart structures have been introduced to replace traditional control actuation systems while interest in active flow control technologies have developed. For smart structures to be effect in active flow control depends on a micro-flow effector's ability to influence the macroscopic flow around the aircraft body. One approach which contributes to this control is the use of flow control surfaces deployed at various points on the aircraft superstructure. For airborne munitions, such control surfaces can be deployed in the forebody of the munition as missiles with slender forebodies face significant yawing moments under asymmetric vortices. Controlling forebody vortex asymmetry is dependent on the sensitivity of the asymmetric flow to the distance between the micro-flow effector and the nose top. The closer the micro-flow effector is to the nose tip, the lower the power required to trigger flow changes.

As such, flow control using micro-surfaces can be applied where manipulation of the velocity and pressure field is desired. Micro-flow effectors can be used in place of traditional control surfaces to reduce weight and volume while maintaining control authority. Boundary layer separation on aircraft wings needs to be controlled because it can result in reduction of lift and micro-flow effectors can be used for separation control.

Current state-of-the-art actuators are based on electromechanical devices and are often used in conventional missile control actuation systems. Examples of such actuators may be found in U.S. Pat. No. 6,685,143 issued to Prince et al, and U.S. Pat. No. 7,070,144 issued to DiCocco et al., the contents of both are being incorporated herein by reference. However due to the nature of flow effectors, the control surface must be close to the nose tip where volume is highly constrained. Since electromechanical systems, such as those disclosed by Prince and DiCocco, require electric motors to be connected to control surfaces through gear trains, the volume used by the components exceed the volume available in the nose envelope. There is therefore a need for a compact actuation system that mitigates if not overcomes the shortcomings of the prior art.

SUMMARY OF THE INVENTION

The present invention relates to systems for controlling flow effector control surfaces. The system comprises a flow effector control surface coupled to an elongated member at one end of the member. The elongated member is coupled at the other end to the middle of a T-shaped bar. A compliant link is coupled to the member between the control surface and the T-shaped bar. At each aned of the T-shaped bar is coupled a shape memory alloy wire which acts as an actuating means. When one of the shape memory alloy wire contracts, the elongated member pivots about the compliant link and activates or retracts the flow effector control surface.

In one aspect of the invention, there is provided a system for controlling a control surface on a device, the system comprising:

a control surface an elongated member coupled to said control surface, said elongated member having a first member end and a second member end a T-shaped bar coupled to said elongated member, said bar having a first bar end and a second bar end, said a pivotable link coupled to said elongated member first actuator means coupled to said T-shaped bar at said first bar end second actuator means coupled to said T-shaped bar at said second bar end wherein said control surface is coupled to said elongated member at said first member end of said elongated member said T-shaped bar is coupled to said elongated member at said second member end of said elongated member, said second member end being coupled to said T-shaped bar at a point between said first bar end and said second bar end when either said first or second actuator means is actuated, said elongated member pivots about said pivotable link to deploy or retract said control surface.

In another aspect, there is provided a flow effector position control system, the system comprising:

an elongated member coupled to said flow effector a T-shaped bar coupled to said elongated member a compliant link coupled to said elongated member between said bar and said flow effector actuator means coupled to said bar wherein when said actuator means are actuated, said elongated member pivots about said compliant link.

BRIEF DESCRIPTION OF THE DRAWINGS

A better understanding of the invention will be obtained by considering the detailed description below, with reference to the following drawings in which:

FIG. 6a shows the results with a piecewise constant command of 0.25 Hz while FIG. 6b shows the results with a square wave command of 0.5 Hz.

DETAILED DESCRIPTION

Figure 1:
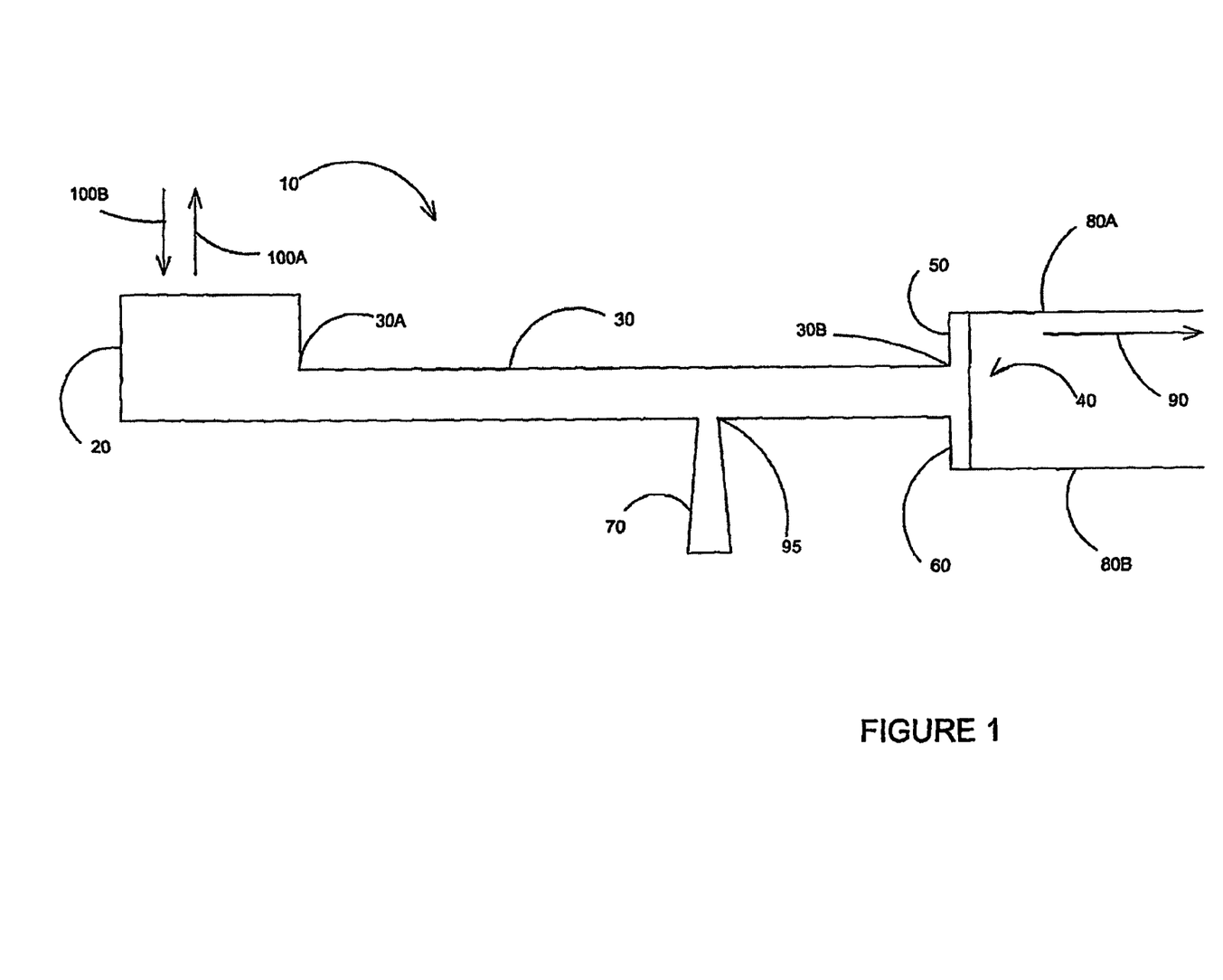
FIG. 1 illustrates a system for actuating a control flow effector according to one embodiment of the invention.

Referring to FIG. 1, a system 10 for actuating a control surface, in this case a control flow effector, is illustrated. The system 10 has a control surface 20 attached to an elongated member 30 at one member end 30A of the member 30. At the other end 30B of the member 30, is attached a T-shaped bar 40 with a first bar end 50 and a second bar end 60. Between the control surface 20 and the T-shaped bar 40 is coupled a compliant link 70 to the elongated member 30. Two actuating means, 80A and 80B are attached to the ends of the T-shaped bar with actuating means 80A being attached to the first bar end 50 and actuating means 80B being attached to the second bar end 60.

When either of the actuating means 80A, 80B is actuated, it pulls in the direction of arrow 90. This activating causes the elongated member 30 to pivot about the pivot point 95 and thereby about the compliant link 70. Depending on which actuating means is activated, the control surface 20 thus moves in either the direction of arrow 100A or 100B. If the actuating means 80A is activated, the control surface 20 moves in the direction of arrow 100A. If the actuating means 80B is activated, then the control surface 20 moves in the direction of arrow 100B. In one embodiment, activating actuating means 80A deploys or actuates the control surface 20 while activating actuating means 80B retracts the control surface 20.

In one embodiment, the actuating means 80A, 80B are shape memory alloy (SMA) wires which contract when actuated. Actuation of the SMA wires involves running a current through the SMA wire. While regular wires, whose actuation may involve pulling the wires, may be used, it has been found that SMA wires provide better results as lesser mechanisms are required.

The pivot point 95 provides a coupling between the link 70 and the elongated member 30. Ideally, the link 70 is a compliant link but other embodiments may use non-compliant links as long as the elongated member 30 is able to pivot about pivot point 95.

Figure 1A:
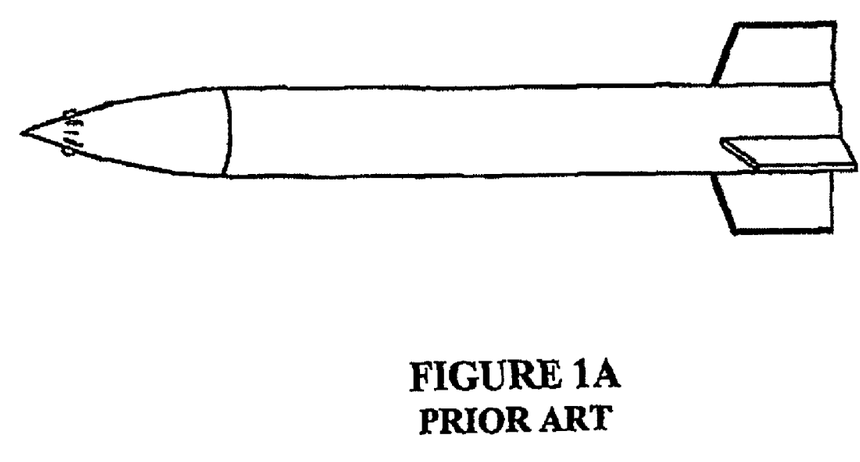
FIG. 1A illustrates an airborne munition with micro-flow effectors deployed in the nose cone of the munition.

It should be noted that in the description of the embodiment that follows, the control surface is a micro-flow effector for use in constrained space applications such as in the nose cone of a missile. FIG. 1A illustrates a missile with the micro-flow effectors deployed at the nose cone. However, the flow-effector may also be used in other parts of airborne munitions or, indeed, in other parts of aircraft. Furthermore, the control surface may be other than micro-flow effectors—any control surface whose actuation involves a range of motion at right angles to a rectilinear activating motion may be used. As can be seen from FIG. 1, the rectilinear motion illustrated be arrow 90 is at right angles to the motion illustrated by arrows 100A, 100B.

The shape memory alloy actuator performance is described using a hybrid micro-macroscopic constitutive law and a one-dimensional heat transfer equation. At the macroscopic level, the global strain is governed by a Reuss-type rule of mixtures law $$\epsilon_{ij} = (1-\Phi)\epsilon_{ij}^A + \Phi\epsilon_{ij}^M \quad (1)$$

where $\epsilon$ is the global strain, $\Phi$ is the total martensite fraction, $\epsilon^A$ is the strain in the austenite phase and $\epsilon^M$ is the strain in the martensite phase.

Strains are assumed to remain within the linear elastic limits of the SMA. The elastic strain in the austenite is given by $$\epsilon_{ij}^A = \frac{1}{E^A}[(1+\upsilon^A)\sigma_{ij} - \upsilon^A \delta_{ij}\sigma_{kk}] + \delta_{ij}\alpha_{ij}^A \Delta T \quad (2)$$

where $E^A$ is the austenite elastic modulus (Pa), $\upsilon^A$ is the austenite Poisson ratio, $\sigma$ is the applied stress (Pa), $\alpha^A$ is the austenite thermal expansion coefficient ($K^{-1}$).

The martensite strain consists of an elastic component (eq. 2, except martensite materials properties are used), a stress-induced phase transformation component and a temperature-induced phase transformation component. The martensite strain is $$\epsilon_{ij}^M = \epsilon_{ij}^{el} + \frac{\Phi^\sigma}{\Phi}\epsilon_{ij}^\sigma \quad (3)$$

where $\epsilon^{el}$ is the elastic strain, $\epsilon^\sigma$ is the stress-induced strain and $\Phi^\sigma$ is the stress-induced martensite fraction. The total martensite fraction is $$\Phi = \Phi^T + \Phi^\sigma \quad (4)$$

where $\Phi^T$ is the temperature-induced martensite fraction.

The stress-induced strain, $\epsilon^\sigma$, is a preferential deformation of the martensite variants in response to an external stress. The strain is given by $$\epsilon_{ij}^\sigma = \frac{1}{N}\sum_{n=1}^{N} f^n(\theta_1, \theta_2, \theta_3) R_{ik}^n R_{jl}^n \epsilon_{kl}^{\sigma n} \quad (5)$$

where N is the number of grains, $f^n(\theta_1,\theta_2,\theta_3)$ is a frequency distribution function, $R_{ik}^n R_{jl}^n$ is the coordinate rotation matrices that rotate the local grain coordinate system to the global coordinate system and $\epsilon^{\sigma n}$ is the average stress-induced variant strain of grain n in the local coordinate system.

Figure 2:
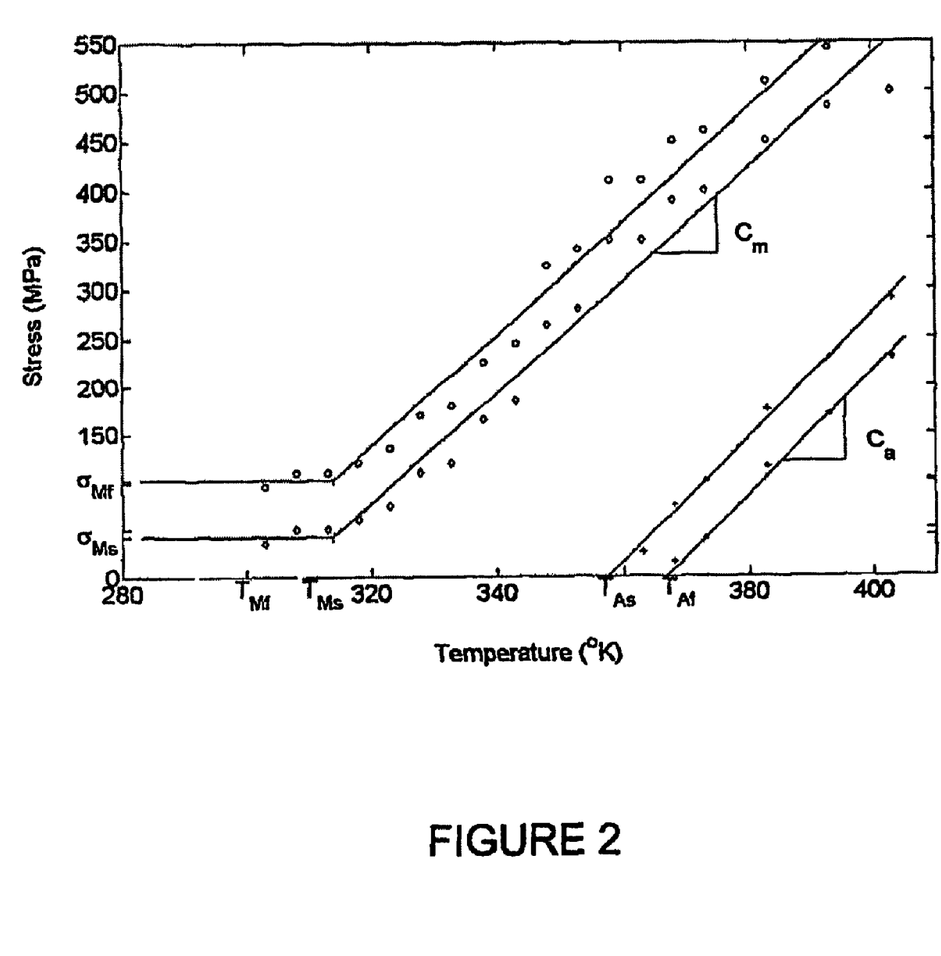
FIG. 2 is a critical stress-temperature transition diagram for a 0.1 mm diameter shape memory alloy (SMA) wire FIG. 3 illustrate open-loop results for an antagonistic SMA actuator subjected to a 2V square wave excitation at 0.1 Hz

The martensite transformation kinetics is defined on a global basis. The model parameters are quantified by a critical stress-temperature diagram (see FIG. 2) derived from constant temperature tensile tests carried out over a temperature range $T<T_{Mf}$ to $T>T_{Af}$ where $T_{Mf}$ is the martensite finish temperature (K) and $T_{Af}$ is the austenite finish temperature (K). The stress-induced martensite fraction is calculated as a function of critical stress at a specific temperature. The martensite fraction versus critical stress relationship is described using a linear function in the form of a Heaviside model.

The temperature-induced martensite fraction, $\Phi^T$, is assumed to be linearly dependent on temperature between the martensite start and finish temperatures.

$$\Phi^T = \frac{T_{Ms} - T}{T_{Ms} - T_{Mf}} \quad (6)$$

where $T_{Ms}$ is the martensite start temperature and $T_{Mf}$ is the martensite finish temperature. The fraction of temperature-induced martensite is subject to the inequality $$\Phi^T \leq 1 - \Phi^\sigma \quad (7)$$

The shape memory alloy actuator is a wire with a large length to diameter ratio and is uniformly heated from resistive heating. The one-dimensional heat transfer equation for heat flow in the radial direction including exo- and endothermic behaviour is $$\rho V \left( C_p \frac{dT}{dt} - H \frac{d\Phi}{dt} \right) = \frac{E^2}{R_{el}} - h_{th}(T - T_a) \qquad (8)$$

where $\rho$ is density (kg/m$^3$), V is the wire volume (m$^3$), $C_p$ is specific heat (J/kg K) and H is latent heat of formation (J/kg), E is the applied voltage (V), $R_{el}$ is the wire resistance (ohms), T is the wire temperature (K), $T_a$ is the ambient temperature (K), $h_{th}$ is the convective thermal conductance (W/K).

Figure 3:
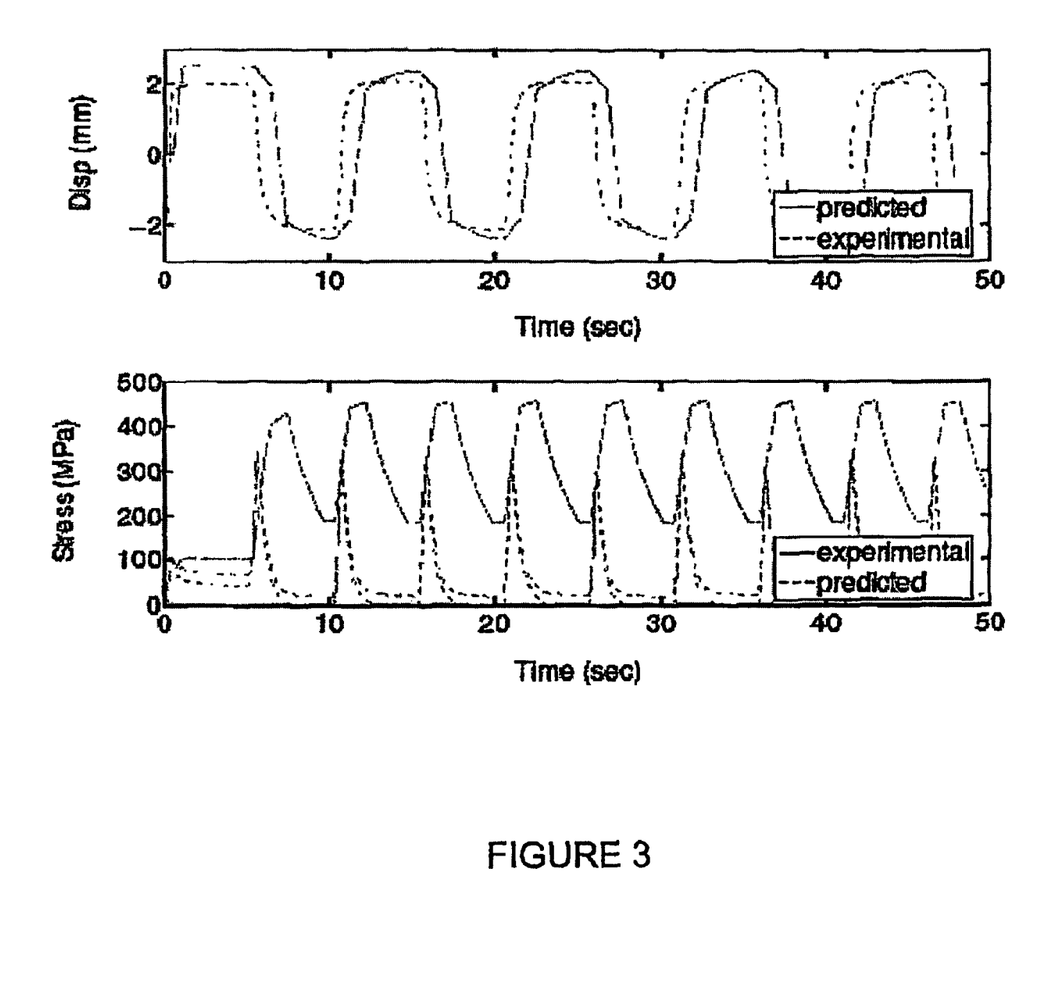

Equations 1 through 8 are used to optimize the open-loop actuator force-displacement-frequency characteristics based on the wire geometry and electrical power input. For a SMA actuator with the material properties given in Table 1, FIG. 3 shows a typical result where a ±2 mm displacement at 0.1 Hz performance is sought. (FIG. 3 shows the open-loop results for an antagonistic SMA actuator subjected to a 2V square wave excitation at 0.1 Hz.)

TABLE 1

Constants for SMA actuator

| Constant | Symbol | Value |
|---|---|---|
| austenite modulus (GPa) | $E^A$ | 45 |
| austenite Poisson ratio (-) | $v^A$ | 0.33 |
| martensite modulus (GPa) | $E^M$ | 20 |
| martensite Poisson ratio (-) | $v^m$ | .33 |
| austenite finish temperature (K) | $T_{Af}$ | 367 |
| austenite start temperature (K) | $T_{As}$ | 358 |
| martensite start temperature (K) | $T_{Ms}$ | 314 |
| martensite finish temperature (K) | $T_{Mf}$ | 300 |
| critical martensite start stress at $T_{Ms}$ (MPa) | $\sigma^*_{Ms}$ | 42 |
| critical martensite finish stress at $T_{Ms}$ (MPa) | $\sigma^*_{Mf}$ | 102 |
| austenite slope (MPa/K) | $C_A$ | 6.5 |
| martensite slope above $T_{Ms}$ (MPa/K) | $C_M$ | 5.75 |
| martensite slope below $T_{Ms}$ (MPa/K) | $C^*_M$ | — |
| thermal conductance (W/K) | $h_{th}$ | 850 |
| electrical resistance (ohm) | $R_{el}$ | 15 |
| density (kg/m$^3$) | $\rho$ | 6500 |
| specific heat (J/kg · K) | $C_p$ | 350 |
| latent heat of formation (kJ/kg) | H | 20 |

The volume restrictions in a missile nose preclude the use of complex linkages to transform the horizontal motion of the SMA actuator to the vertical motion required by the flow effector. A compliant link was coupled to the micro-flow effector to transform the SMA force and displacement into an output force and displacement required by the flow effector while maximizing mechanical efficiency.

Figure 3A:
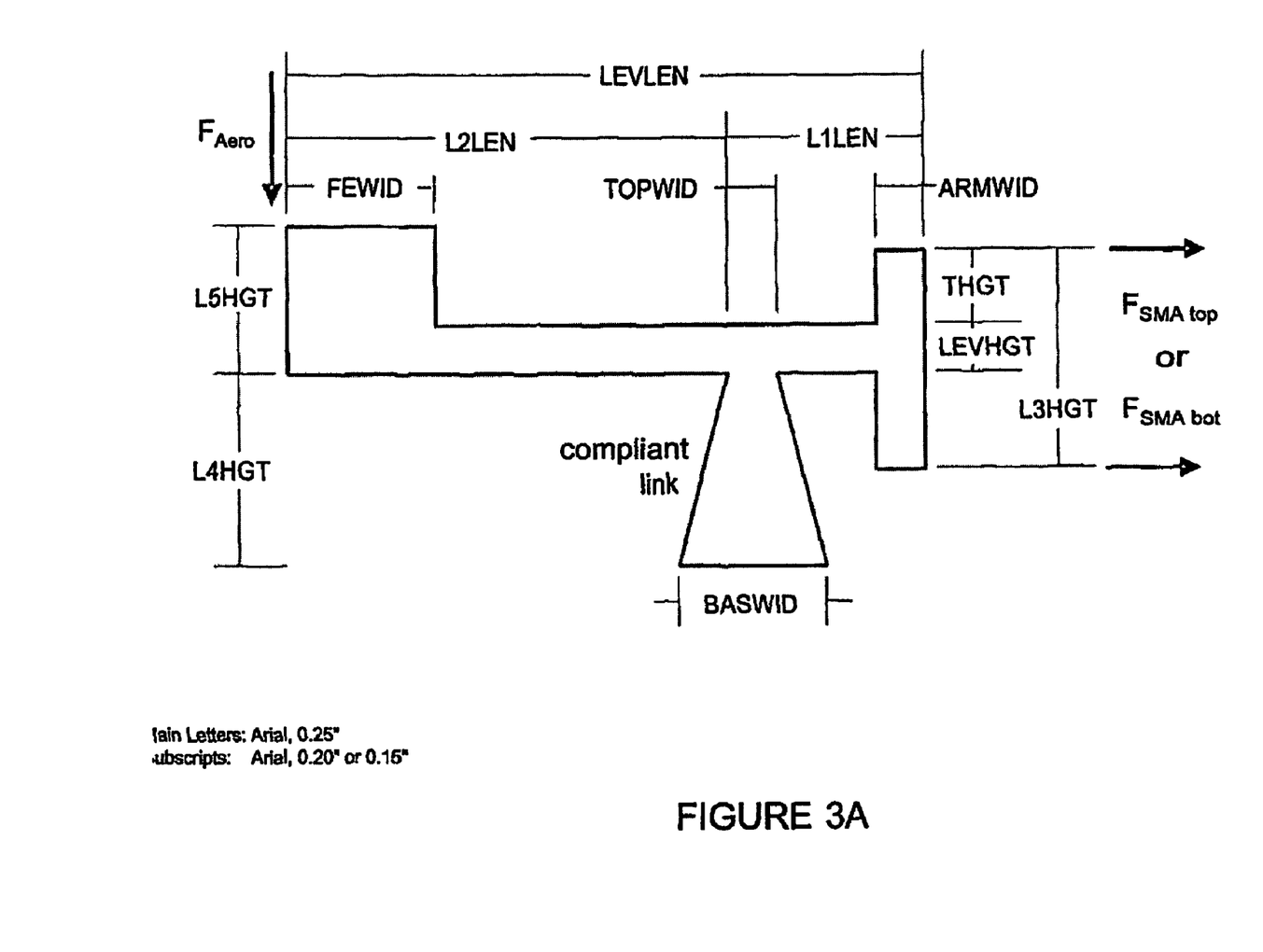
FIG. 3A is a schematic diagram of a micro-flow effector according to one embodiment of the invention.

A schematic of the micro-flow effector with compliant link is shown in FIG. 3A. The flow effector is actuated by applying one of the SMA forces at the T-section. The geometry was optimized to minimize the bending stresses in the compliant link and SMA attachment points while maximizing the tip displacement. The lever arm ratio 'L2LEN' to 'L1LEN' controlled the amplification of the upward displacement at 'FEWID' for a horizontal displacement to the right at 'THGT'.

The micro-flow effector is fabricated from a 787 micron thick Ti-6A14V sheet stock. The tip of the micro-flow effector is required to displace 1 mm while subjected to a maximum aerodynamic load of 0.172 N. No yielding of the material is permitted. The SMA wire described in Table 1 can generate between 150 g and 185 g force at voltages starting at 0.5 VDC. Table 2 lists the dimensions of the optimized micro-flow effector and the expected performance.

Closed loop control of the micro-flow effector requires a feedback sensor to monitor the tip displacement magnitude. Two semi-conductor strain gages are mounted at the base of the compliant link in a half-bridge arrangement to measure the bending strains which are proportional to the tip displacement.

TABLE 2

Optimized micro-flow effector mechanism dimensions

| Parameter | Value | Performance | Value |
|---|---|---|---|
| L1LEN (micron) | 3607 | $F_{SMA}$ low top only SMA disp (micron) | +370 |
| L2LEN (micron) | 21132 | | |
| L3HGT (micron) | 3429 | Effector tip disp (micron) | +1820 |
| L4HGT (micron) | 2540 | Effector post stress (MPa) | 800 |
| L5HGT (micron) | 2286 | $F_{SMA}$ high top plus $F_{Aero}$ | +220 |
| TOPWID (micron) | 254 | SMA disp (micron) | |
| BASWID (micron) | 279 | Effector tip disp (micron) | +1010 |
| ARMWID (micron) | 762 | Effector post stress (MPa) | 640 |
| LEVHGT (micron) | 762 | $F_{SMA}$ low bottom only | +21 |
| FEWID (micron) | 2667 | SMA disp (micron) | |
| LEVLEN (micron) | 24739 | Effector tip disp (micron) | +56 |
| THGT (micron) | 1207 | Effector post stress (MPa) | 250 |
| Yield Stress (MPa) | 882 | | |
| Modulus (MPa) | 115 | | |
| $F_{SMA}$ low (g) | 150 | | |
| $F_{SMA}$ high (g) | 185 | | |
| $F_{Aero}$ (N) | 0.172 | | |

Figure 4:
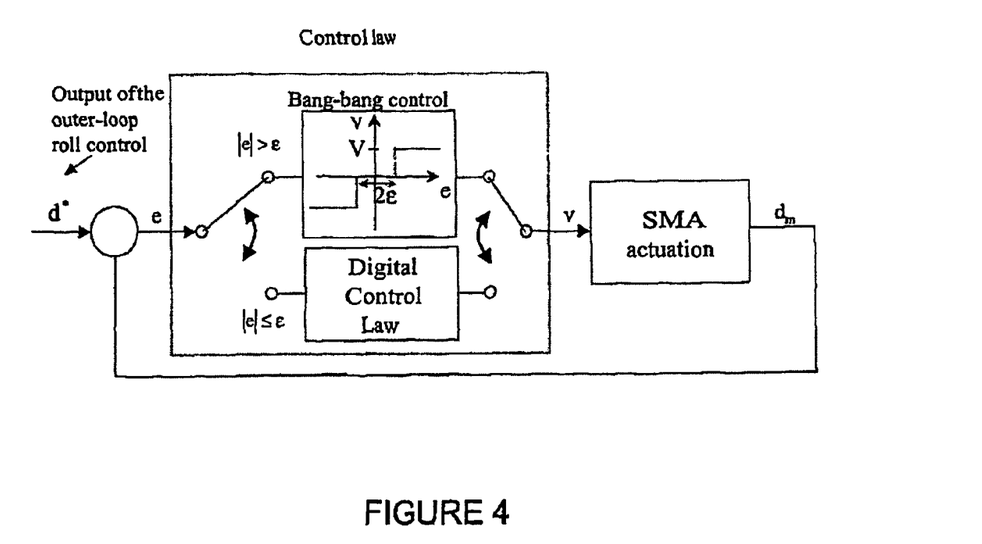
FIG. 4 shows a circuit for variable structure control of the system illustrated in FIG. 1
Figure 5:
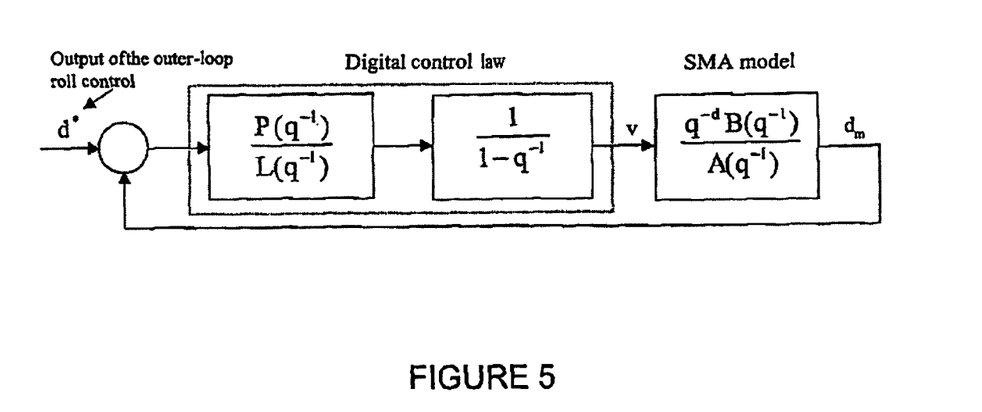
FIG. 5 is a feedback control diagram of the SMA discrete-time control in the vicinity of the steady state

To control the positioning of the control surface, a digital controller was designed to control the effector position of an SMA actuation mechanism over a range of 1 mm and within a bandwidth of [0 Hz, 1 Hz]. To meet these requirements, a two-step variable structure control law is proposed (see circuit/control diagram in FIG. 4 and the feedback control diagram in FIG. 5). The control law consists of:

A bang-bang control, $\upsilon = V\text{sign}(e)$, which is triggered whenever $|e|$ is greater than a threshold $\epsilon$.

A discrete-time control law which ensures set-point regulation near the equilibrium and prevention of high frequency chattering.

The choice of the threshold $\epsilon$ results from a trade-off between a large value to avoid fast switching from one controller to another and a small value to warrant reliable computation of the controller's state-space variables at the switching time. A small $\epsilon$ indicates that the closed-loop system is close to its steady state.

The direct digital design ensures that pole placement of the closed-loop system leads to the computation of coefficients $l_0$, $l_1$, $l_2$, $p_0$, $p_1$, $p_2$ in polynomials $L(q^{-1})$ and $P(q^{-1})$. The discrete-time control law, as shown in FIG. 5, is comprised of an integrator $1/(1-q^{-1})$ in series with $P(q^{-1})/L(q^{-1})$. The model of the plant in series with the integrator yields $q^{-1}B(q^{-1})/\overline{A}(q^{-1})$ where $\overline{A}(q^{-1})=(1-q^{-1})A(q^{-1})$ and $B(q^{-1})=b_1+b_2q^{-1}$. Polynomial $A(q^{-1})$ is of degree two. Henceforth, $$\overline{A}(q^{-1}) = (1 - q^{-1})(1 + a_1 q^{-1} + a_2 q^{-2})1 + \qquad (9)$$
$$(a_1 - 1)q^{-1} + (a_2 - a_1)q^{-2} - a_2 q^{-3}$$
$$= \overline{a}_0 + \overline{a}_1 q^{-1} + \overline{a}_2 q^{-2} + \overline{a}_3 q^{-3}.$$

The model of the closed-loop system is written as, $$\frac{d_m}{d^*} = \frac{q^{-d}PB}{L\bar{A} + q^{-d}BP} = \frac{q^{-d}PB}{A^*} \quad (10)$$

where $A^*(q^{-1})$ is a polynomial of degree 5. Let $z_i = e^{s_i T_s}$, for $i=1, \ldots 5$, the zeros of $A^*$. Therefore, poles of the closed-loop transfer function $d_m/d^*$ are equal to $z_i$, $i=1 \ldots 5$, if the coefficients of $L(q^{-1})$ and $P(q^{-1})$ satisfy the following system when $d=1$ $$\begin{bmatrix} \bar{a}_0 & 0 & 0 & 0 & 0 & 0 \\ \bar{a}_1 & \bar{a}_0 & 0 & b_1 & 0 & 0 \\ \bar{a}_2 & \bar{a}_1 & \bar{a}_0 & b_2 & b_1 & 0 \\ \bar{a}_3 & \bar{a}_2 & \bar{a}_1 & 0 & b_2 & b_1 \\ 0 & \bar{a}_3 & \bar{a}_2 & 0 & 0 & b_2 \\ 0 & 0 & \bar{a}_3 & 0 & 0 & 0 \end{bmatrix} \begin{bmatrix} l_0 \\ l_1 \\ l_2 \\ p_0 \\ p_1 \\ p_2 \end{bmatrix} = \begin{bmatrix} a_0^* \\ a_1^* \\ a_2^* \\ a_3^* \\ a_4^* \\ a_5^* \end{bmatrix} \quad (11)$$

where $a_i^*$, for $i=1, \ldots 5$, are such that $$A^*(q^{-1}) = a_0^* + a_1^* q^{-1} + a_2^* q^{-2} + a_3^* q^{-3} + a_4^* q^{-4} + a_5^* q^{-5} \quad (12)$$
$$= (q^{-1} - z_1)(q^{-1} - z_2)(q^{-1} - z_3)(q^{-1} - z_4)(q^{-1} - z_5).$$

The identified model gives rise to undershoot that is caused by unstable zeros. Locating dominating poles of $d_m/d^*$ at $s_1=s_2=-3$, while $s_3=s_4=s_5=-30$, gives satisfactory responses in terms of the rise time and the transients.

Figure 6A:
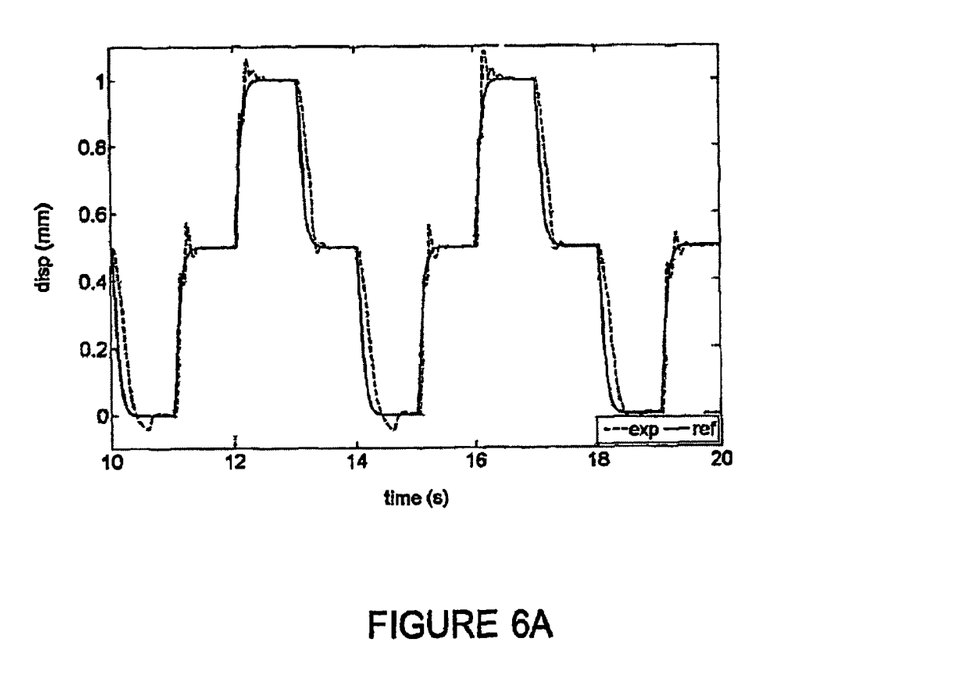
FIGS. 6a and 6b illustrates the experimental results of the SMA micro-flow effector set-point regulation.
Figure 6B:
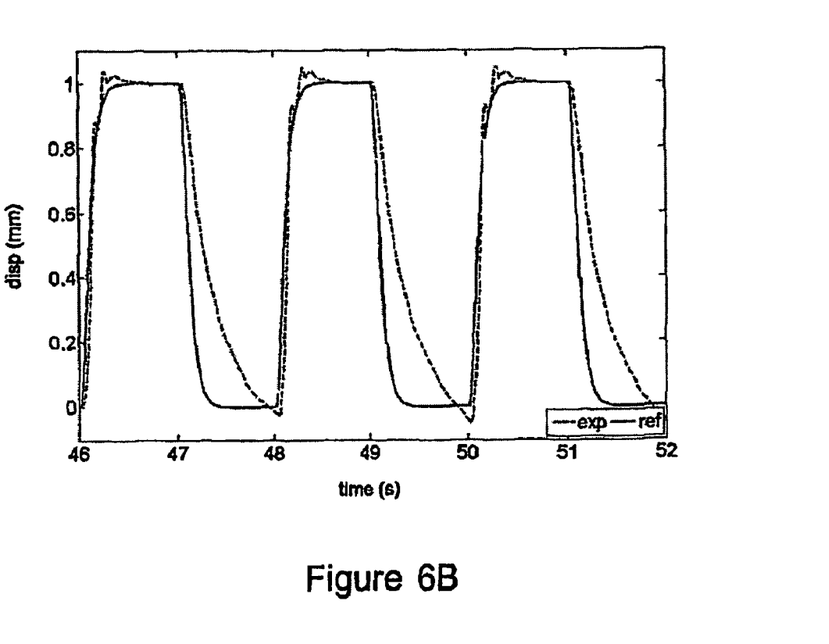

The two-step variable structure controller was implemented on a LabView platform with a sample period of 10 ms. The voltage applied to the SMA wires was generated by a pulse width modulator (PWM), with a switching frequency of 400 Hz. The output voltage of the PWM for the bang-bang control is approximately 3 V while the discrete-time control voltage is approximately 0.8 V. FIGS. 6A and 6B show typical set-point-regulated flow effector position schedules. The actuator under feedback control shows fast responses during the rising part of the motion and zero steady error. Furthermore, there is no chattering because the digital controller replaces the bang-bang law for small tracking errors. The response time is less than 0.3 sec with an overshoot of about 5% of the steady state value. When the heat transfer rate is increased by forced convection, a frequency of 1 Hz can be attained.

A person understanding this invention may now conceive of alternative structures and embodiments or variations of the above all of which are intended to fall within the scope of the invention as defined in the claims that follow.

What is claimed is:

1. A system for controlling a control surface on a missile, the system comprising:
   a control surface;
   an elongated member coupled to said control surface of said missile, said elongated member having a first member end and a second member end;
   a T-shaped bar coupled to said elongated member, said bar having a first bar end and a second bar end;
   a pivotable link coupled to said elongated member;
   first actuator means coupled to said T-shaped bar at said first bar end;
   second actuator means coupled to said T-shaped bar at said second bar end;
   wherein
   said control surface is coupled to said elongated member at said first member end of said elongated member;
   said T-shaped bar is coupled to said elongated member at said second member end of said elongated member, said second member end being coupled to said T-shaped bar at a point between said first bar end and said second bar end;
   when either said first or second actuator means is actuated, said elongated member pivots about said pivotable link to deploy or retract said control surface.

2. A system according to claim 1 wherein said pivotable link is a compliant link.

3. A system according to claim 1 wherein said first and second actuator means are shape memory alloy wires.

4. A system according to claim 3 wherein said first and second actuator means are actuated by contracting said wires.

5. A system according to claim 1 wherein said control surface is a flow effector.

* * * * *